(12) United States Patent
Murray et al.

(10) Patent No.: US 9,031,085 B2
(45) Date of Patent: May 12, 2015

(54) ROUTING PATH CALCULATION APPARATUS AND METHODS

(75) Inventors: Christopher Warren Murray, Ottawa (CA); Reza Mohammad Rokui, Kanata (CA); Ehsan Rezaaifar, Kanata (CA); Chuong Ngoc Ngo, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1392 days.

(21) Appl. No.: 11/692,578

(22) Filed: Mar. 28, 2007

(65) Prior Publication Data

US 2008/0239958 A1    Oct. 2, 2008

(51) Int. Cl.
| | |
|---|---|
| H04L 12/28 | (2006.01) |
| H04L 12/707 | (2013.01) |
| H04L 12/751 | (2013.01) |
| H04L 12/715 | (2013.01) |
| H04L 12/733 | (2013.01) |
| H04L 12/721 | (2013.01) |
| H04L 12/703 | (2013.01) |
| H04L 12/725 | (2013.01) |
| H04L 12/717 | (2013.01) |
| H04L 12/773 | (2013.01) |

(52) U.S. Cl.
CPC ............... *H04L 45/22* (2013.01); *H04L 45/02* (2013.01); *H04L 45/04* (2013.01); *H04L 45/122* (2013.01); *H04L 45/124* (2013.01); *H04L 45/28* (2013.01); *H04L 45/306* (2013.01); *H04L 45/42* (2013.01); *H04L 45/44* (2013.01); *H04L 45/60* (2013.01)

(58) Field of Classification Search
USPC .................................................. 370/216, 409
See application file for complete search history.

(56) References Cited

U.S. PATENT DOCUMENTS

| | | | | |
|---|---|---|---|---|
| 6,711,152 | B1 * | 3/2004 | Kalmanek et al. ............ | 370/351 |
| 7,515,529 | B2 * | 4/2009 | Vasseur et al. ................ | 370/221 |
| 2004/0190446 | A1 * | 9/2004 | Ansorge et al. ............... | 370/228 |
| 2006/0039391 | A1 * | 2/2006 | Vasseur et al. ................ | 370/409 |
| 2008/0075008 | A1 * | 3/2008 | Kano ............................ | 370/238 |

* cited by examiner

*Primary Examiner* — Omer S Mian
(74) *Attorney, Agent, or Firm* — Eckert Seamans Cherin & Mellott, LLC

(57) ABSTRACT

Routing path calculation apparatus and methods are disclosed. Calculation of routing paths within different routing areas of a communication system is handled by respective routing path calculation devices. Multiple devices may be requested to perform respective routing path calculations for segments of a routing path between endpoints in different routing areas. Recalculations may be requested from the same or different devices in the event of a change in a routing area that affects a segment of a routing path. A routing path calculation device, whether or not in this type of distributed routing path calculation system, may determine whether a previously configured path exists between an intermediate node of a calculated routing path, and take the previously configured path into account in calculating the routing path if it is determined that a previously configured path exists. The previously configured path may be an Interior Gateway Protocol (IGP) shortcut, for example.

16 Claims, 6 Drawing Sheets

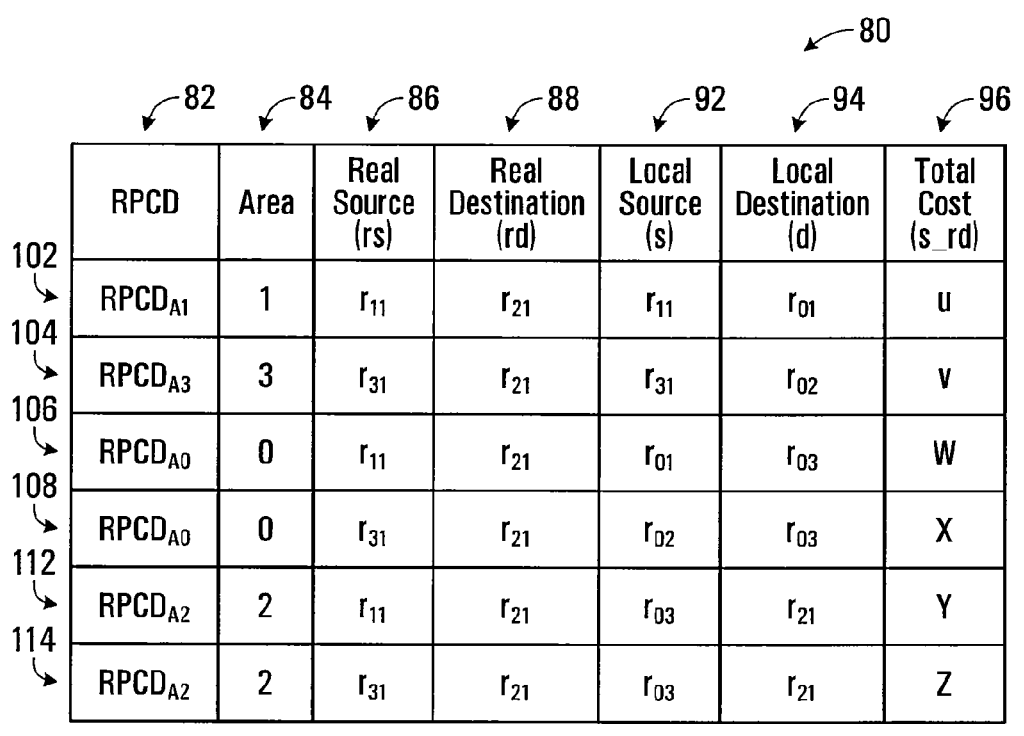

| RPCD | Area | Real Source (rs) | Real Destination (rd) | Local Source (s) | Local Destination (d) | Total Cost (s_rd) |
|---|---|---|---|---|---|---|
| RPCD$_{A1}$ | 1 | $r_{11}$ | $r_{21}$ | $r_{11}$ | $r_{01}$ | u |
| RPCD$_{A3}$ | 3 | $r_{31}$ | $r_{21}$ | $r_{31}$ | $r_{02}$ | v |
| RPCD$_{A0}$ | 0 | $r_{11}$ | $r_{21}$ | $r_{01}$ | $r_{03}$ | w |
| RPCD$_{A0}$ | 0 | $r_{31}$ | $r_{21}$ | $r_{02}$ | $r_{03}$ | x |
| RPCD$_{A2}$ | 2 | $r_{11}$ | $r_{21}$ | $r_{03}$ | $r_{21}$ | y |
| RPCD$_{A2}$ | 2 | $r_{31}$ | $r_{21}$ | $r_{03}$ | $r_{21}$ | z |

FIG. 4

ROUTING PATH CALCULATION APPARATUS AND METHODS

FIELD OF THE INVENTION

This invention relates generally to communications and, in particular, to calculating routing paths in communication systems.

BACKGROUND

With jitter- and/or delay-sensitive applications such as Video on Demand (VoD) and Voice over Internet Protocol (VoIP) over an Internet Protocol (IP) core, two generic methods are currently used to assure the quality of connections. One method uses Resource reSerVation Protocol (RSVP) to reserve bandwidth, and the other relies on pure IP routing. The first method takes advantage of RSVP to guarantee reserved bandwidth at all times, which might not result in a resource-optimized core. The second method requires centralized bandwidth management to guarantee reserved bandwidth at connection creation time or in network failure scenarios, since an IP network is not aware of how its links are actually used.

In order to manage connections and their needed bandwidths, the routing path and the required bandwidth for each connection must be known.

When routing path endpoints lie in different routing areas of a communication system, calculation of routing paths can become time- and resource-intensive. In a centralized routing path calculation model, for example, inter-area routing path calculation would require the collection and maintenance of up-to-date routing information for all routing areas at a centralized location, and processing of that information at the centralized location each time a routing path is to be calculated. The amount of routing information to be collected and maintained can itself be problematic in terms of storage requirements. Processing of this routing information at a centralized location can also introduce time delays where multiple routing paths are to be calculated. A centralized processing scheme might be limited in terms of the number of routing paths that it can calculate simultaneously, for instance.

There may also be potential issues with change handling in a centralized model. For example, it will take time for changes in a communication system to be reflected in a centralized database. In addition, any such change may necessitate the recalculation of all routing paths by a centralized routing path calculator. A centralized routing path calculator might not be able to determine which particular routing paths could be affected by a change, and accordingly may recalculate all routing paths. This would not be an effective use of resources, especially where a change does not actually have any effect on a majority of existing paths.

Considering routing path calculations themselves, some routing protocols enable paths between communication system nodes to be pre-configured. A path between two nodes might be specially configured to handle a certain Class of Service (CoS), for example. According to conventional routing path calculation schemes, such pre-configured paths are only taken into account if they originate at the source node of a routing path currently being calculated. Such paths may originate at intermediate nodes along a routing path, but are not used when calculating a routing path that traverses such intermediate nodes.

Thus, there remains a need for improved routing path calculation techniques.

SUMMARY OF THE INVENTION

Some embodiments of the present invention provide distributed computation of shortest paths between any pairs of IP addresses or IP subnets, and automatic re-computation of network routes for all registered paths when network topology changes. Distributed computation may be provided for both inter-area routing paths, including multiple segments, and intra-area routing path, which may include a single segment. The techniques disclosed herein may be applied, for example, to any link-state Interior Gateway Protocols (IGPs), such as Open Shortest Path First (OSPF) and Intermediate System to Intermediate System (IS-IS). Routing paths calculated using the disclosed techniques may be implemented to provide routing path information for such applications as bandwidth management and/or session admission control for VoIP and/or VoD, for instance.

According to an aspect of the present invention, an apparatus includes an interface operable to enable communications with a plurality of routing path calculation devices, the routing path calculation devices being capable of calculating routing paths within respective routing areas of a communication system, and a routing path calculation control module operatively coupled to the interface and operable to request, from multiple routing path calculation devices of the plurality of routing path calculation devices, respective routing path calculations for segments of a routing path between routing path endpoints in different routing areas of the respective routing areas.

The apparatus may also include a change detection module operatively coupled to the routing path calculation control module and operable to detect a change in a routing area that affects a segment of the routing path. The change detection module may be further operatively coupled to the interface and be operable to detect a change in a routing area by receiving through the interface an indication of the change from the routing path calculation device that is capable of calculating routing paths within the routing area.

The routing path calculation control module may be further operable to request, from multiple routing path calculation devices of the plurality of routing path calculation devices, respective routing path recalculations for segments of a routing path between the routing path endpoints responsive to detection of a change that affects a segment of the routing path by the change detection module. In this case, the apparatus may also include a memory operatively coupled to the routing path calculation control module, and the routing path calculation control module may be further operable to store in the memory an indication of the routing path and indications of each respective segment of the routing path, and to determine whether a routing path between the path endpoints is to be recalculated by accessing the memory to determine whether the segment affected by the detected change is a segment of the routing path.

In some embodiments, the routing path calculation control module is further operable to identify routing areas of the plurality of routing areas in which the segments of the routing path are to be calculated. The multiple routing path calculation devices from which routing path calculations are requested then include the routing path calculation devices that are capable of calculating routing paths within the identified routing areas.

The plurality of routing areas may include routing areas that use different routing protocols.

Such an apparatus may be implemented in a system that also includes the routing path calculation devices, with each routing path calculation device collecting routing information associated with its routing area.

One or more of the routing path calculation devices may be operable to determine in its routing path calculations whether a previously configured path exists between an intermediate node of a routing path segment and another node of the routing path segment, and to take the previously configured path into account in calculating the routing path segment if it is determined that a previously configured path exists.

A method is also provided, and includes determining that a routing path between routing path endpoints in different routing areas of a communication system is to be calculated, and requesting, from multiple routing path calculation devices of a plurality of routing path calculation devices that are capable of calculating routing paths within respective routing areas of the communication system, routing path calculations for respective segments of the routing path.

The method may also include detecting a change in a routing area that affects a segment of the routing path, such as by receiving an indication of the change from the routing path calculation device that is capable of calculating routing paths within the routing area.

In some embodiments, the method also includes requesting, from multiple routing path calculation devices of the plurality of routing path calculation devices, routing path recalculations for respective segments of a routing path between the routing path endpoints responsive to detection of a change that affects a segment of the routing path.

The method may also include identifying routing areas of the plurality of routing areas in which the segments of the routing path are to be calculated, in which case requesting may involve requesting routing path calculations from the routing path calculation devices that are capable of calculating routing paths within the identified routing areas.

Each routing path calculation device of the plurality of routing path calculation devices may collect routing information associated with its routing area.

In some embodiments, the method involves at least one of the routing path calculation devices determining in its routing path calculations whether a previously configured path exists between an intermediate node of a routing path segment and another node of the routing path segment, and taking the previously configured path into account in calculating the routing path segment if it is determined that a previously configured path exists.

Such a method may be implemented, for example, in the form of instructions stored on a computer-readable medium.

An apparatus according to another aspect of the invention includes a routing path calculation module operable to calculate routing paths within a routing area of a communication system, and an interface operatively coupled to the routing path calculation module and operable to enable the routing path calculation module to communicate with a controller. The routing path calculation module is further operable to receive from the controller, through the interface, a request for a routing path calculation for a segment of a routing path between routing path endpoints in different routing areas of a plurality of routing areas of the communication system. The plurality of routing areas include the routing area within which the routing path calculation module is operable to calculate routing paths. The routing path calculation module is further operable to provide an indication of a result of the routing path calculation to the controller through the interface.

The apparatus may also include a change detection module operatively coupled to the interface and operable to detect a change in the routing area that affects the segment of the routing path, and to provide an indication of the detected change to the controller through the interface.

In some embodiments, the routing path calculation module is operable to calculate routing paths by determining whether a previously configured path exists between an intermediate node of a routing path segment and another node of the routing path segment, and by taking the previously configured path into account in calculating the routing path segment if it is determined that a previously configured path exists.

Another aspect of the invention provides an apparatus that includes a routing path calculation module operable to calculate routing paths in a communication system, the routing paths traversing nodes of the communication system, and a path detection module operatively coupled to the routing path calculation module and operable to determine whether a previously configured path exists between an intermediate node of a routing path calculated by the routing path calculation module and another node of the routing path. The routing path calculation module is further operable to take the previously configured path into account in calculating the routing path if it is determined that a previously configured path exists. The previously configured path may be an Interior Gateway Protocol (IGP) shortcut, for example.

According to a still further aspect of the invention, there is provided a method that includes determining that a routing path in a communication system is to be calculated, the routing path traversing nodes of the communication system, determining whether a previously configured path exists between an intermediate node of a routing path and another node of the routing path, and taking the previously configured path into account in calculating the routing path if it is determined that a previously configured path exists. As noted above, an IGP shortcut is one example of a previously configured path.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

FIG. 4 is a block diagram of a routing path segment table.

DETAILED DESCRIPTION OF PREFERRED EMBODIMENTS

Figure 1:
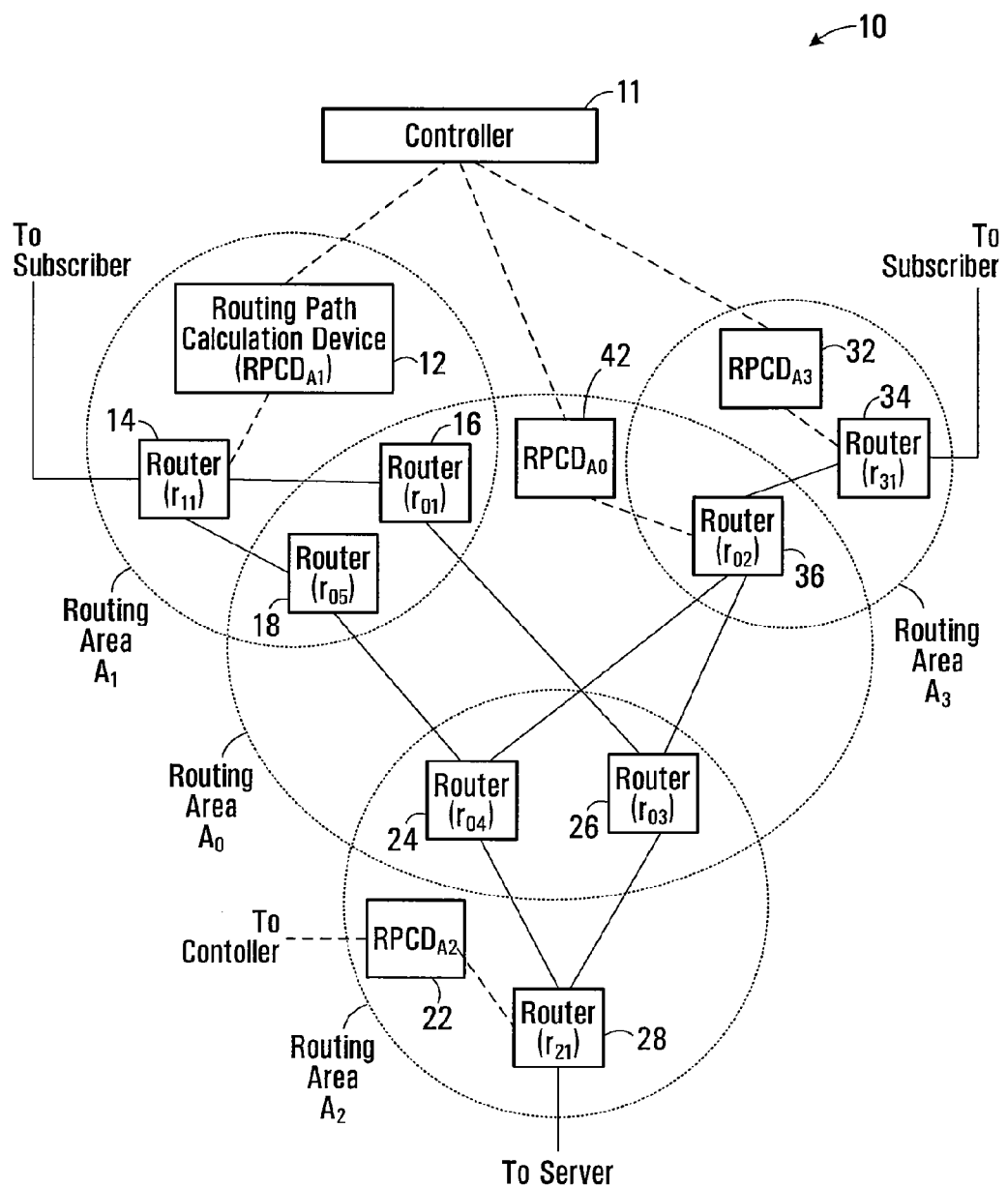
FIG. 1 is a block diagram of a communication system.

FIG. 1 is a block diagram of a communication system in which embodiments of the invention may be implemented. The communication system 10 includes a controller 11 and multiple routing areas, which may be part of the same or different communication networks. Each routing area includes routers 14, 16, 18, 24, 26, 28, 34, 36 and, in accordance with an aspect of the invention, a respective routing path calculation device (RPCD) 12, 22, 32, 42. A communication system may include a different number of routing areas with more or fewer routers, and possibly other components. Additional routing areas, routers, and components have not been explicitly shown in FIG. 1 so as to avoid overly complicating the drawing.

It should therefore be appreciated that the system of FIG. 1, as well as the contents of the other drawings, are intended solely for illustrative purposes, and that the present invention is in no way limited to the particular example embodiments explicitly shown in the drawings and described herein. Other embodiments may include fewer, further, and/or different components, which are interconnected in a similar or different manner, than shown.

The controller 11 may be implemented at a Network Management System (NMS) or other system(s) for managing routing path calculations in the communication system 10. An example of a controller 11 is described in further detail below with reference to FIG. 2. The routing areas $A_0$, $A_1$, $A_2$, $A_3$ represent areas within which the routing path calculation devices 12, 22, 32, 42 are capable of calculating routing paths. A routing area might be an IP subnet, a domain, an IGP area, or some other form of area within an operational and/or administrative boundary. A single communication system may include routing areas that use different routing protocols.

Each routing path calculation device 12, 22, 32, 42 can calculate routing paths within its respective area. For example, the routing path calculation device 12 can calculate routing paths within the area $A_1$. However, it should be appreciated that multiple routing path calculation devices may be implemented on a single physical platform, thus allowing for a single RPCD platform having multiple routing path calculation devices for calculating routing paths in multiple routing areas. Even in this case, however, routing paths would still be calculated independently for different routing areas by the multiple routing path calculation devices.

A routing path calculation device may be substantially similar in structure to a router, although the routing path calculation devices 12, 22, 32, 42 need not necessarily participate in the actual routing of communication traffic. In some embodiments, the routing path calculation devices 12, 22, 32, 42 collect routing information in substantially the same way as routers, and thus need not be operatively coupled to all routers, or more generally to all nodes, in a routing area. In FIG. 1, each routing path calculation device 12, 22, 32, 42 is operatively coupled to one router, although other embodiments in which a routing path calculation device is operatively coupled to multiple routers, or even all routers in a routing area, are also possible. An example of a routing path calculation device 12, 22, 32, 42 is described below, with reference to FIG. 3.

The routers 14, 16, 18, 24, 26, 28, 34, 36 are illustrative examples of nodes that routing paths in a communication system may traverse. Those skilled in the art will be familiar with routers, as well as their operation. A skilled person will also be familiar with communication systems in general, and accordingly known system components and their operation are described herein only to the extent necessary to convey an understanding of embodiments of the invention. The present invention is in no way limited to any particular types of communication systems or arrangements.

Some embodiments of the invention relate to calculation of routing paths that span multiple routing areas. Such routing paths may be used to provide a VoD service from a video server that communicates with the router 28 ($r_{21}$) in the routing area $A_2$ to subscribers that access the communication system 10 through the routing areas $A_1$, $A_3$, for example.

Figure 2:
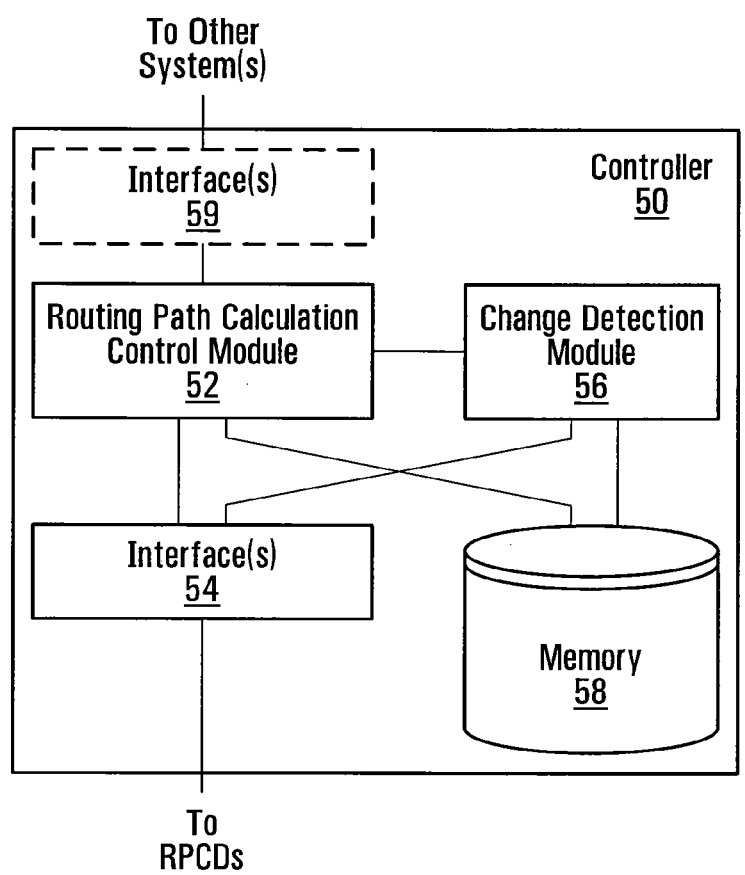
FIG. 2 is a block diagram of an example controller.

FIG. 2 is a block diagram of an example controller. In accordance with one embodiment of the invention, the controller 50 includes a routing path calculation control module 52, one or more routing path calculation device interface(s) 54 operatively coupled to the routing path calculation control module, a change detection module 56 operatively coupled to the routing path calculation control module and to the interface(s) 54, and a memory 58 operatively coupled to the routing path calculation control module and to the change detection module. One or more interface(s) 59 to other systems may also be provided in some embodiments.

A communication system device or component in which or in conjunction with which the controller 50 is implemented may include other components in addition to those shown in FIG. 2. It should be appreciated that only components involved in routing path calculation functions have been explicitly shown in the controller 50. It should also be appreciated that not all of the components shown in FIG. 2 need necessarily be provided in every embodiment of the invention. Thus, the controller 50 is representative of one illustrative embodiment of the invention. Other embodiments may be implemented using further, fewer, or different components than shown in FIG. 2, with similar or different interconnections.

The types of connections through which the components of FIG. 2 are operatively coupled may, to at least some extent, be implementation-dependent. Communication equipment components often use various types of physical connectors and wired connections such as midplane and backplane conductors, although the present invention is in no way limited to wired connections. In the case of cooperating software functions, for example, an operative coupling may be through variables or registers, and thus be an indirect coupling rather than a direct physical coupling.

The interface(s) component 54 represents one or more interfaces, and possibly interfaces of multiple different types, that enable the controller 50 to communicate with routing path calculation devices in multiple routing areas. Although only a single routing path calculation device interface(s) component 54 is shown in FIG. 2, multiple interfaces, and potentially different types of interfaces, may be provided in some embodiments to communicate with different routing path calculation devices. Two routing path calculation devices may be associated with routing areas in which different routing protocols are used, for example, and these routing path calculation devices may potentially support different types of interfaces 54 with the controller 50. In general, the number and types of interfaces may vary depending on the communication system and communication equipment in conjunction with which the controller 50 is implemented. Those skilled in the art will be familiar with many examples of interfaces that may be suitable for this purpose.

If the controller 50 is to interact with other systems or components, for receiving requests for routing path calculations from communication system applications and/or reporting calculated routing paths to such applications, for example, additional interface(s) 59 may be provided. An Application Programming Interface (API) is one example of this type of interface. Multiple interfaces 59 of the same or different types may be provided. Although it is possible that the interface(s) 54 and the interface(s) 59 may be or include one or more common types of interfaces, it is expected that most implementations will employ different types of interfaces for communication with routing path calculation devices and other systems or components.

One or more memory devices may be used to implement the memory 58. Solid state memory devices are common in communication and computing equipment, although other types of memory devices, including devices for use with movable or even removable storage media, may also or instead be used.

As described in further detail below, the routing path calculation control module 52 and the change detection module 56 may be involved in managing inter-area routing path calculations in a communication system. At least these components may be implemented using hardware, firmware, software for execution by one or more processing elements, or some combination thereof. Any or all of devices such as microprocessors, microcontrollers, Programmable Logic Devices (PLDs), Field Programmable Gate Arrays (FPGAs), Application Specific Integrated Circuits (ASICs), Network Processors (NPs), and other types of "intelligent" integrated circuits may be suitable for this purpose.

Given the many possible options for implementing at least the modules 52, 56, these modules are described herein primarily in terms of their functions. Based on the functional descriptions, a person skilled in the art will be enabled to implement techniques according to embodiments of the invention in any of various ways.

When a connection or a bundle of connections is about to be created, a service management system may need to know if a current routed network can absorb the new request. That system would have to know the would-be routing path of the connection, and that there is enough bandwidth left on the links in the routing path. Thus, one possible role of the controller 50 may be to receive a source/destination pair of a new connection through an interface 59 and quickly provide the routing path to the service management system through the same interface. Such a path could span multiple routing areas regardless of their routing protocols.

In the event of a network failure, the controller 50 might also inform the service management system of new routing paths for all affected (rerouted) previously calculated paths so that the service management system can update the bandwidth usage on communication system links and take appropriate actions if there are calls or other sessions that might experience degraded quality. Other types of changes than failures might also affect existing routing paths.

In accordance with aspects of the invention described in further detail herein, records of "registered" routing paths are stored in the memory 58, and routing paths are recalculated as network failures and/or possibly other changes occur. Distributed computing is combined with inter-area route advertising in some embodiments to achieve fault/change handling time constraints.

The following paragraphs briefly introduce some of the terminology that is used below.

A managed route, also referred to as a routing path, is an end-to-end path between endpoints that may lie in different routing areas. In one embodiment, a managed route or routing path is an IP path from a given source router ($rs_i$) to a given destination router ($rd_i$). Where both the source and destination are routers, their IP prefix length is 32. It should be appreciated, however, that a router is intended to be an illustrative example of a communication system node that may be traversed by a routing path. The present invention may be used in conjunction with routing paths that traverse other types of nodes than routers. Embodiments of the invention may allow managed routes from any IP address to any other IP address, including router IDs, for example, i.e., not just router to router. As noted above, a managed route or routing path may span multiple routing areas and thus, multiple routing path calculation devices. A managed route between $rs_i$ and $rd_i$ in the examples described below is represented as $MR_i = (rs_i, rd_i)$.

A managed sub-route is a component of a managed route that is completely contained in a single routing area and accordingly is calculated by a single routing path calculation device. Managed sub-routes are also referred to herein as routing path segments. A managed sub-route or segment for a managed route $MR_i$ that exists in an area A, starts on a router $s_i$, and ends on router $d_i$ within that area is identified by $MSR_{i,A} = (A, rs_i, rd_i, s_i, d_i)$ below.

In some embodiments, routing path calculation devices collect routing information within their routing areas, and therefore may be considered a form of IP listener. Since these devices also calculate routing paths, they may also be considered route analyzers.

A controller 50, which may as noted above be implemented at least partially in software, controls and coordinates managed routes and sub-routes.

A topology change event, or more simply a change, is any event that has an impact on the topology of a communication system. This type of event may include any or all of: link up events, link down events, router status events, link metric changes, and possibly others.

An application is intended to generally designate any other system or component that may request routing path calculations from a controller and/or receive routing paths and updates from a controller.

Referring now to FIG. 2, an interface 54 is operable to enable communications between the controller 50 and a plurality of routing path calculation devices. The routing path calculation devices are capable of calculating routing paths within respective routing areas of a communication system. When implemented in the communication system 10 of FIG. 1 for instance, the interface(s) 54 would enable the controller 50 to communication with any of the routing path calculation devices 12, 22, 32, 42. The routing path calculation control module 52 is operable to request, from multiple routing path calculation devices, respective routing path calculations for segments of a routing path between routing path endpoints in different routing areas.

The routing path calculation control module 52 is capable of identifying which routing areas and/or routing path calculation devices are to be involved in the calculation of an end-to-end inter-area routing path. For example, the routing path calculation control module 52 may already have a view of the complete topology of a communication system and which routers belong to which routing areas. A system model or topology information might be stored in the memory 58, for example. A query, discovery, or other mechanism might also or instead be provided to allow the routing path calculation module 52 to find and subsequently use routing path calculation modules.

The routing path calculation control module 52 might query multiple routing path calculation devices in order to locate the source routing area in which the source node of a routing path is located, and its corresponding routing path calculation device, for example. The routing path calculation control module 52 could locate the routing area and routing path calculation device for intermediate nodes and the destination node in a similar manner. Intermediate node routing area and device location may be performed as segment calculation results are received from routing path calculation devices, as the next intermediate area and device may depend on the local destination node returned for each segment along a routing path. The routing path calculation control module 52 may thus identify routing areas in which segments of a routing path are to be calculated, and request routing path calculations from the routing path calculation devices that are capable of calculating routing paths within the identified routing areas.

The change detection module 56 is operable to receive a change event from routing path calculation devices in a routing area that affects a segment of the routing path. Changes in the state of a communication link (link up, link down), changes in the state of a router or other equipment, and changes to the cost or some other metric associated with a communication link, which may be manually entered by network management personnel or arise due to link state changes for instance, are examples of changes that may affect a segment of a routing path.

As shown, the change detection module 56 is operatively coupled to an interface 54. A change in a routing area may thus be detected by the change detection module 56 by receiving an indication of the change from a routing path calculation device that is capable of calculating routing paths within that routing area. Change notifications by a routing path calculation module are described in further detail below.

This type of change detection at the controller 50 is not intended to limit the scope of the present invention, but may be desirable to speed up the detection of change in network topology. Other types of change detection schemes, including those in which the change detection module 56 takes a more active role, illustratively by detecting changes in a network database stored in the memory 58, for example, are also possible. However, since routing path calculation devices may be implemented within their respective routing areas and thus be able to more quickly detect changes, it may generally be desirable to have each routing path calculation device perform active change detection and notify the controller 50 of any detected changes that affect previously calculated routing paths.

When a change that affects a segment of a managed route is detected by a routing path calculation device, an event is sent to the change detection module 56. The change detection module 56 then provides an indication of the detected change to the routing path calculation control module 52. This indication may take any of various forms, such as an alert signal, an interrupt, a flag, etc. One action that may be taken by the routing path calculation control module 52 responsive to detection of a change by the change detection module 56 is to recalculate a routing path that includes a segment affected by the detected change. The routing path calculation control module 52 may thus request, from multiple routing path calculation devices, respective routing path recalculations for segments of a routing path between the same routing path endpoints. The same or a different path segments may be calculated by the routing path calculation devices after a change.

In one embodiment, the routing path calculation control module 52 may restrict path recalculations to certain segments or routing areas. However, if real-time path recalculations are important, the routing path calculation control module 52 may request recalculations for all path segments of an affected routing path without spending time to process detected changes to determine specific path segments that should be recalculated.

It should be apparent that a controller 50 may manage many different managed routes and their respective sub-routes or segments. Therefore, it may be useful in some embodiments to provide a mechanism whereby the routing path calculation control module 52 can identify the particular routing path that should be recalculated. To this end, a mapping table that associates a routing path with its segments may be stored in the memory 58 as routing paths are calculated and segment calculation results are returned to the routing path calculation control module 52. A mapping table might store an indication of each routing path and indications of each segment of each routing path, for example. Based on such a mapping, the routing path calculation control module 52 may determine whether a routing path between path endpoints is to be recalculated by accessing the memory 58 to determine whether a segment affected by a detected change is a segment of the routing path. In another embodiment, routing path calculation devices detect changes that affect routing path segments, determine the routing path of which an affected segment is a part, and report the determined routing path to the controller that is managing the routing path.

Figure 3:
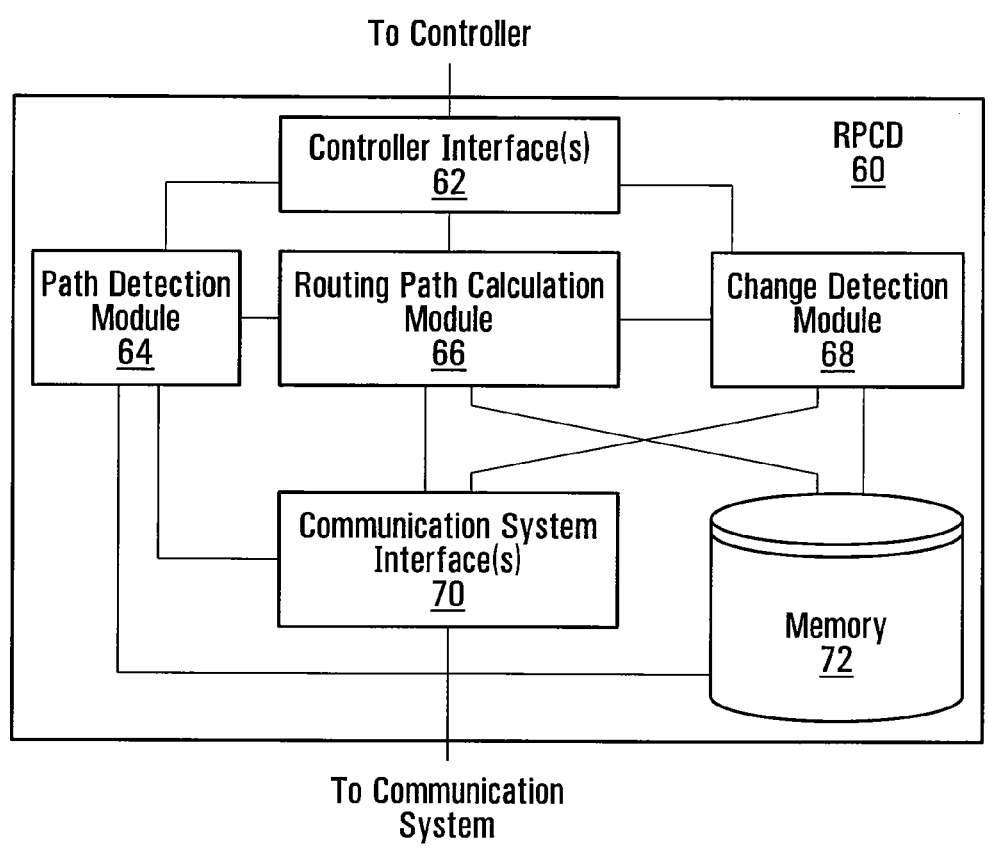
FIG. 3 is a block diagram of an example routing path calculation device.

Turning now to FIG. 3, an example of a routing path calculation device will be considered in detail. The routing path calculation device 60 includes one or more controller interface(s) 62, a routing path calculation module 66 operatively coupled to the controller interface(s) 62, to a path detection module 64, and to a change detection module 68, one or more communication system interface(s) 70 operatively coupled to the path detection module, to the routing path calculation module, and to the change detection module, and a memory 72, which is also operatively coupled to the path detection module, to the routing path calculation module, and to the change detection module. The path detection module 64 and the change detection module 68 are operatively coupled to the controller interface(s) 62.

A communication system device or component in which or in conjunction with which the routing path calculation device 60 is implemented may include other components in addition to those shown in FIG. 3. The device 60 is intended to be representative of one illustrative embodiment of the invention. Other embodiments may be implemented using further, fewer, or different components, with similar or different interconnections.

As in FIG. 2, the types of connections through which the components of FIG. 3 are operatively coupled may differ between implementations. Any of various types of physical connectors and wired connections such as midplane and backplane conductors could be used for this purpose, although connections other than wired connections, including indirect and/or logical couplings through memory areas or registers for instance, are also contemplated.

The controller interface(s) component 62 represents one or more interfaces, and possibly interfaces of multiple different types, that enable the routing path calculation device 60 to communicate with one or more controllers. In many implementations, a routing path calculation device 60 will be configured to interact with only one controller. However, this need not necessarily be the case, and in a multiple-controller implementation, a single shared controller interface or possibly multiple controller interfaces may be used for communications with the controllers.

A routing path calculation device 60 may interact with other components of a communication system for such purposes as to collect routing information within its routing area. This type of interaction is enabled in the routing path calculation device 60 by the communication system interface(s) 70. In one embodiment, the communication system interface(s) 70 would include a signalling interface through which routers in a communication system exchange routing information, illustratively in the form of Link State Advertisements (LSAs). Other types of communication system interfaces 70 may also or instead be provided, depending on how the routing path calculation module 66 is to obtain routing information for use in calculating routing paths.

The memory 72, like the memory 58 (FIG. 2), may include one or more memory devices, such as solid state memory devices and/or other types of memory devices for use with movable or even removable storage media.

The path detection module 64, the routing path calculation module 66, and the change detection module 68 may all participate in routing path calculation, as described in further detail below, and may be implemented using hardware, firmware, software for execution by one or more processing elements, or some combination thereof. Like the modules 52, 56 of FIG. 2, the modules 64, 66, 68 may be implemented using any or all of devices such as microprocessors, microcontrollers, PLDs, FPCAs, ASICs, NPs, and other types of "intelligent" integrated circuits, and are described herein primarily in terms of their functions. Those skilled in the art will be enabled to implement techniques according to embodiments of the invention in any of various ways based on the functional descriptions.

In one embodiment, the routing path calculation module 66 is operable to calculate routing paths within a routing area of a communication system responsive to routing path calculation requests received from a controller through a controller interface 62. In a distributed system, a request for a routing path calculation relates to a segment of a routing path between routing path endpoints in different routing areas of a communication system.

The routing path calculation module 66 may calculate shortest paths, for example, based on routing information that is collected through a communication system interface 70 and stored in the memory 72. Any of various route calculation algorithms, also sometimes referred to as route or path computation algorithms, may be used by the routing path calculation module 66 to determine routing paths. Those skilled in the art may be or become aware of suitable calculation/computation algorithms. When a routing path calculation is complete, the routing path calculation module 66 provides an indication of a result of the routing path calculation to the controller through a controller interface 62.

The change detection module 68 detects changes in the routing area of the routing path calculation device 60 that affect any segments that the device has calculated for a routing path. As noted above, these changes may include link state changes, router status changes, link metric changes, and possibly others. The present invention is not limited to the use of any particular detection scheme(s) by the change detection module 68 to detect changes to a communication system. Changes might be detected by the change detection module 68 by receiving LSAs from routers through a communication system interface 70 and/or by searching or otherwise accessing a system model in the memory 72, for example.

After a change has been detected, the change detection module 68, either directly through a controller interface 62 or indirectly through the routing path calculation module 66, provides an indication of the detected change, or at least an affected routing path segment and/or routing path, to the controller. The controller can then take steps to recalculate an entire routing path, as described above.

The above functions of the controller 50 (FIG. 2) and the routing path calculation device 60 (FIG. 3) will now be considered in more detail by way of an illustrative example. Reference will be made to FIGS. 1 to 4. FIG. 4 is a block diagram of a routing path segment table.

For the purposes of this illustrative example, suppose that the communication system 10 of FIG. 1 is an OSPF network with four areas: area 1 ($A_1$), area 2 ($A_2$), area 3 ($A_3$), and area 0 ($A_0$), with $A_0$ being a backbone area. The routing path calculation device 12, 22, 32, 42 that is responsible for each area receives various Router and Network LSAs. From these LSAs, each routing path calculation device 12, 22, 32, 42 builds a Shortest Path First (SPF) tree, generally referred to as a Shortest Path Tree (SPT), for each router in its area, giving $m_A$ SPF trees, where $m_A$ is the number of routers in an area A.

Using the notation introduced above, two managed routes that may be created to provide the subscribers in the areas $A_1$ and $A_3$ with access the server in the area $A_2$ are $MR_1 = (r_{11}, r_{21})$ and $MR_3 = (r_{31}, r_{21})$.

The controller 11, 50, which may discover or already have a view of the topology of the communication system 10, determines the start area for each managed route. Using this information, the controller 11, 50, and in particular the routing path calculation control module 52, starts querying routing path calculation devices and setting up managed sub-routes on the routing path calculation devices.

Specifically, for $MR_1$, the routing path calculation control module 52 of the controller 11, 50 determines that $r_{11}$ is in the area $A_1$, and asks the routing path calculation device 12 for the area $A_1$ for a managed sub-route between $r_{11}$ and $r_{21}$. The routing path calculation device 12, and in particular its routing path calculation module 66, determines that the shortest path from $r_{11}$ to $r_{21}$ is a path that goes from the router 14 ($r_{11}$) and terminates on the Area Border Router (ABR) 16 ($r_{01}$). Route calculations may also or instead involve determination and processing of other criteria than route length, such as cost and/or other metrics for different candidate sub-routes.

The managed sub-route is then installed at the routing path calculation device 12. Installing a route at a routing path calculation device 60, as those skilled in the art will appreciate, entails storing information for the routing path in a database in the memory 72.

The controller 11, 50 is also informed of the sub-route ($A_1$, $r_{11}$, $r_{21}$, $r_{11}$, $r_{01}$) by the routing path calculation device 12, and at least route/sub-route mapping information for that sub-route is stored at the controller in the memory 58.

Based on the received managed sub-route for the area $A_1$, the controller 11, 50 realizes that it does not reach to the destination. Thus, based on the ABR 16 (router $r_{01}$), the controller 11, 50 will find the next area $A_0$. In the area $A_0$, the controller 11, 50 asks the routing path calculation device 42 for a managed sub-route starting on the ABR 16 ($r_{01}$) to the router 28 ($r_{21}$), with the real source of $r_{11}$. The routing path calculation device 42 determines that the managed sub-route is ($A_0$, $r_{11}$, $r_{21}$, $r_{01}$, $r_{03}$), installs this sub-route locally and returns the sub-route to the controller 11, 50. Similarly, the controller 11, 50 determines the next area $A_2$, and then asks for a managed sub-route starting on the router 26 ($r_{03}$) to the router 28 ($r_{21}$), with the real source of $r_{11}$. The route calculation device 22 then calculates and installs the managed sub-route ($A_2$, $r_{11}$, $r_{21}$, $r_{03}$, $r_{21}$) and returns the sub-route to the controller 11, 50. The controller 11, 50 then knows that the end of the route has been reached since the destination $d_i$ and the real destination $rd_i$ are the same. A similar sequence happens for $MR_3$.

At the end, the routing path calculation devices are installed with the managed sub-routes as shown in FIG. 4 for the managed routes $MR_1$ and $MR_3$.

The table 80 in FIG. 4 represents one form in which routing path segment information might be stored. In the example shown, a record 102, 104, 106, 108, 112, 114 is stored for each routing path segment. Each record includes a field 82 storing an indication such as an address or other identifier of the routing path calculation device that calculated the segment, a field 84 storing an indication of the routing area of the segment, fields 86, 88 storing indications of the routing path endpoints, in the form of real source (rs) and real destination (rd) routers, fields 92, 94 storing indications of local segment endpoints, in the form of local source (s) and local destination (d) routers, and a field 96 storing a total cost associated with a portion of the routing path from the local source to the real destination.

The present invention is in no way limited to the particular contents or arrangement of information shown in the table 80. Other embodiments may include fewer, further or different data fields, in a similar or different order than shown.

For example, where each routing path calculation device locally stores only its own calculated segments, the fields 82, 84 might be returned to a controller but need not be stored at a routing path calculation device. In this case, the routing path calculation device for each area locally stores information only for sub-routes that cross its own area, and accordingly there might be no reason to store indications of the routing path calculation device or the area at 82, 84. Other arrangements of information might similarly be used to leverage data fields that are common between sub-routes of a managed route. Also, costs or other routing path metrics might not be used in all embodiments, and therefore might not always be stored.

At a controller, as noted above, only a mapping of managed routes to corresponding managed sub-routes might be stored in order to correlate sub-route changes to the managed route for recalculation. Thus, not all of the information shown in the table 80 would necessarily be stored in a controller memory 58.

As an example of a topology change event, suppose the routing path calculation device 12 for the area $A_1$ detects a topology change from a received Router or Network LSA. The routing path calculation device 12, or specifically its routing path calculation module 66, may then rebuild its SPF trees if necessary, determine whether any managed sub-routes are affected by the change, and if so, notify the controller 11, 50.

The change detection module 56 receives the notification from the routing path calculation device 12, and the routing path calculation control module 52 correlates the change notification to the managed route.

Once the affected managed route is identified by the routing path calculation control module 52, recalculations for an entire routing path between the endpoints of the affected may be requested. A new routing path is calculated substantially as described above. In one embodiment, the notification from the routing path calculation device 12 is in the form of a new calculated sub-route for the area $A_1$, and in this case a recalculation for the area $A_1$ has already been made. The routing path calculation control module 52 then requests recalculations from areas other than the area $A_1$ to complete the recalculation of a new routing path.

A routing path recalculation may instead be more selective. In one selective recalculation scenario based on the local destination in a routing area in which a change is detected, there are two possible cases: $d_i$ in the routing area remains the same and $d_i$ changes.

If $d_i$ is not changed, the detected change only affects this routing area. The controller 11, 50 rebuilds the managed route to include the new segment, after requesting a recalculation for that segment if this has not already been completed, and may also notify an application or other system of the change in the managed route.

Where $d_i$ has changed, the detected change affects this routing area and potentially all other managed sub-routes (and routing areas) along the managed route. In this case, the controller 11, 50 may remove all managed sub-routes for the affected managed route and replace them with new managed sub-routes, using the new $d_i$ as the source for the next managed sub-route. In the worst case, a detected change may propagate along the entire managed route to the real destination.

Cost and/or other metrics may be considered when determining, for example, whether a detected change should be reported to the controller 11, 50 and/or whether an entire routing path or only specific segments thereof should be recalculated. Cost may be considered to ensure that only a single routing path calculation device 12, 22, 32, 42 sends an event to the controller 11, 50 for any routing path, and that the routing path calculation device that reports a change is the closest to the real source of the managed route as possible.

Selective reporting of a recalculation might not be implemented in all embodiments. A mechanism in which a routing path calculation device that detects a change notifies the controller of the change, and a controller that receives a change detection notification requests recalculations for an entire routing path that has one affected segment, might provide the fastest response to a detected change. In the event that a controller does receive multiple change notifications for the same routing path from different routing path calculation devices, any notifications after the first notification can be ignored, since a routing path recalculation would already be under way responsive to the first received notification.

The path detection module 64 in FIG. 3 represents another function that may be provided in some embodiments. In many service provider networks, special routing paths such as IGP shortcuts are configured in order to provide more control of communication traffic flows, for example. An IGP shortcut might be provided to carry certain types of traffic flows between nodes or as a preferred path between nodes. Existing next hop calculations performed by a router, however, only take into account IGP shortcuts that originate at that router, and not at any intermediate nodes along a routing path.

In the routing path calculation device 60, the path detection module 64 enables a shortcut consideration function, according to which one or more shortcuts sourced from one or more routers along a computed routing path may be selected as part of the routing path. More generally, the path detection module 64 is operable to determine whether a previously configured path exists between an intermediate node of a routing path and another node of the routing path. The routing path calculation module 66 takes the previously configured path, and possibly each such path, into account in calculating the routing path if it is determined by the path detection module 64 that a previously configured path exists.

In the case of a service management application, this type of functionality could be important in that bandwidth usage by a traffic flow could go beyond the maximum bandwidth reserved for a shortcut. The actual route of a shortcut should be known by the service management system, while the source, destination, and metric(s) such as cost, of the shortcut are known by the routing path calculation system. The routing path calculation system may also be aware of other criteria that are used to calculate routing paths that include shortcuts. For example, if shortcuts are used for particular traffic classifications based on CoS, the CoS(s) for each shortcut would also be known.

A Label Switched Path (LSP) configured as an IGP shortcut is one example of a previously configured path that might be detected by the path detection module 64. An IGP shortcut can be used to reach all destinations, along an IGP SPF path, downstream of where the shortcut terminates.

IGP shortcuts can be configured to be applicable to only certain CoS values. Therefore, in this case, the SPF could be calculated separately for each different CoS that is supported by a communication system. For example, where 8 different CoS values are supported, one could configure an IGP shortcut to a distant router for CoSs 1 through 4. If no other IGP shortcuts had been configured, SPF calculations according to OSPF or IS-IS would determine that forwarding to the distant router for CoSs 1 to 4 uses the IGP shortcut and forwarding to the distant router for CoSs 5 to 8 uses the regular OSPF or IS-IS SPF path.

When an IGP shortcut is configured on a node, that shortcut typically remains local to that node and is not flooded to the other nodes in the network. As a result, nodes are not aware of IGP shortcuts that have been configured on other nodes.

In accordance with an aspect of the invention, however, information relating to previously configured paths such as shortcuts is provided to a routing path calculation device 60 so that the path detection module 64 may detect such paths. This information may be provided to the path detection module 64 through a controller interface 62, for example, where the information is received by a controller from one of its applications or another system. If this information is stored in the memory 72, the path detection module 64 may detect shortcuts and/or other specially configured paths that exist between an intermediate node and another node along a routing path by accessing the memory. The path detection module 64 or the routing path calculation device 60 may also or instead include one or more additional interfaces (not shown) for receiving information associated with these specially configured paths.

The information itself may initially be stored at an NMS or other management/control location when paths are first configured. In most cases, it is expected that these paths will be configured manually, through a user interface such as a Graphical User Interface and/or through a machine to machine interface such as an Operations Support System (OSS) interface.

It should be noted that the manner in which shortcuts and other specially configured paths are created and managed is not critical for the purposes of the present invention. Aspects of the invention relate to detection of such paths and the inclusion of detected paths in routing path calculations.

One other important note on shortcut-related aspects of the invention is that these aspects may be applied to centralized or distributed routing path calculations. Therefore, a routing path calculation device that takes shortcuts and other special paths into account in its routing path calculations may, but need not necessarily, cooperate with other routing path calculation devices to calculate inter-area routing paths as described above.

Figure 5:
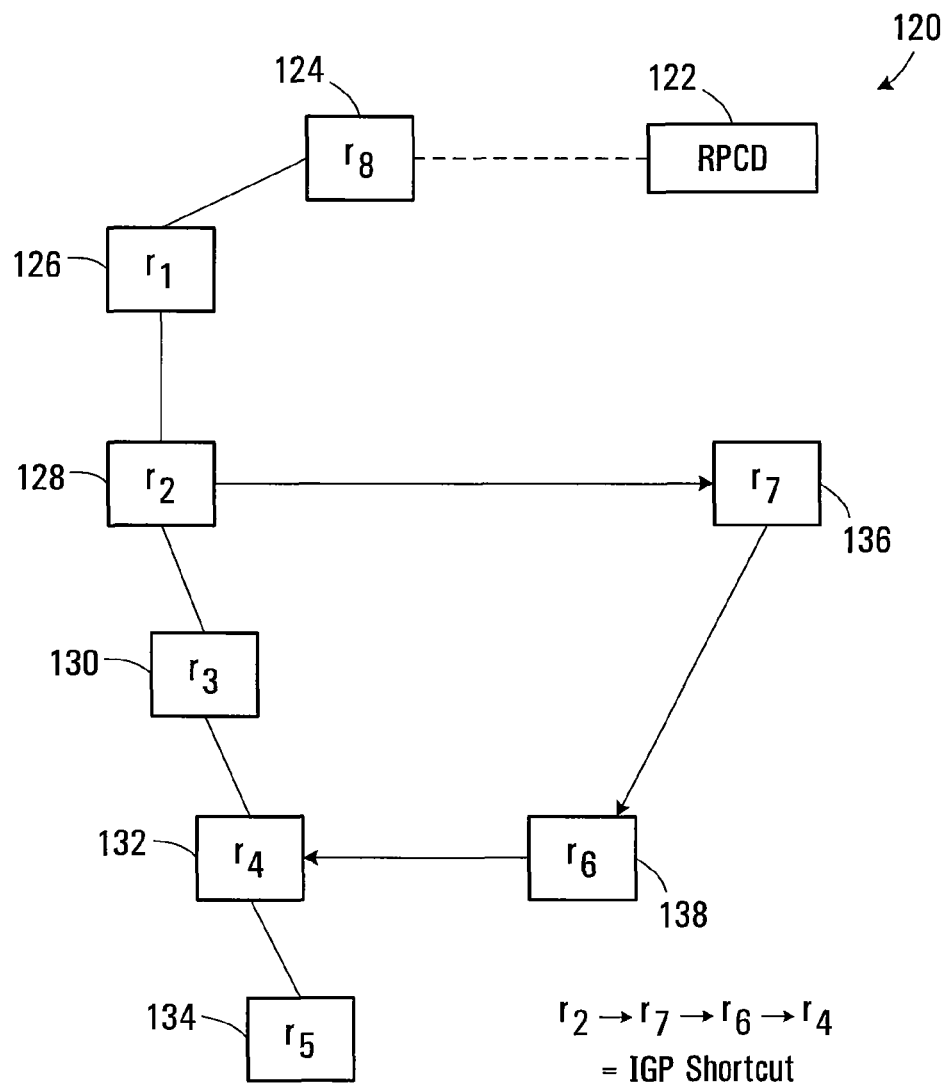
FIG. 5 is a block diagram representation of a collection of routers in another example communication system.

Referring now to FIG. 5, which shows a collection of routers in another example communication system, this functionality will be explained in further detail. The example system 120 has a routing path calculation device 122 and 8 routers 124, 126, 128, 130, 132, 134, 136, 138 ($r_1$ to $r_8$). An IGP shortcut is also configured between the routers 128 ($r_2$) and 132 ($r_4$) for all CoSs 1 to 8.

In a first example, the routing path calculation device 122 receives a request to calculate a shortest path from $r_1$ to $r_5$. The calculated SPF route without considering the IGP shortcut is ($r_1$, $r_2$, $r_3$, $r_4$, $r_5$). However, since there is an IGP shortcut between two nodes that the calculated SPF route traverses, the routing path calculation device 122 will return the following SPF route in response to the request: ($r_1$, $r_2$, IGP shortcut, $r_4$, $r_5$).

As a second example, suppose that the routing path calculation device 122 receives a request to calculate an SPF routing path from $r_1$ to $r_3$. The SPF routing path without considering the IGP shortcut is ($r_1$, $r_2$, $r_3$). The routing path calculation device 122 does not use the IGP shortcut in this case because one endpoint of the shortcut ($r_4$) is not included in the calculated shortest path. As a result, the routing path calculation device 122 will return the following SPF route: ($r_1$, $r_2$, $r_3$).

In a similar manner, the IGP shortcut would not be included in a calculated routing path if the IGP shortcut has not been configured to carry a traffic CoS for which the routing path calculation is being performed. Thus, any of various criteria might be applied by a path detection module 64 (FIG. 3) and/or a routing path calculation module 66 in detecting paths or determining whether a calculated routing path should be modified to include any detected path(s). For example, the routing path calculation module 66 might decide not to modify a calculated routing path to include a detected shortcut where the routing path and the shortcut handle different CoSs, or such a shortcut might not be considered by the path detection module 64 as satisfying detection criteria. In this way, selection and/or detection criteria may be applied to previously configured paths such as shortcuts.

It will be apparent from the foregoing that a routing path calculation module 66 that takes into account a previously configured path might not necessarily include that path in a resulting calculated routing path.

Figure 6:
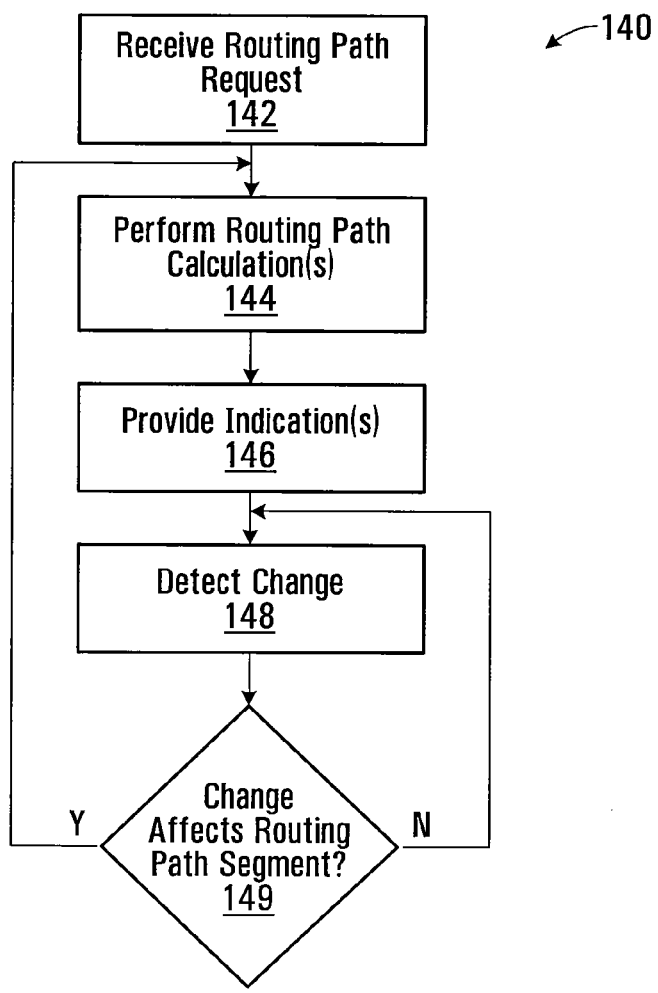
FIG. 6 is a flow diagram of a routing path calculation method.

FIG. 6 is a block diagram of a routing path calculation method. The method 140 begins at 142 with a step of receiving a routing path request. This is one example of how it could be determined that a routing path is to be calculated. Such a routing path may be between routing path endpoints in different routing areas of a communication system in some embodiments.

In a distributed routing path calculation embodiment, routing path calculations are requested from multiple routing path calculation devices that are capable of calculating routing paths within respective routing areas of a communication system. The routing path calculation devices calculate respective segments of the routing path at 144, and provide indications thereof to a controller at 146.

Some embodiments of the invention are not limited to distributed routing path calculations, and thus multiple calculations might not be performed at 144. The step of providing an indication of a routing path need not necessarily be performed in all embodiments, such as in a centralized routing path calculation mechanism, for example.

If a change in the communication system is detected at 148, then a determination is made at 149 as to whether that change that affects at least a segment of a routing path. If so, one or more path recalculations are made at 144. Otherwise, since the detected change does not affect a routing path segment or a routing path, no path recalculations are in order.

The method 140 is illustrative of one embodiment of the invention. Other embodiments may include fewer, further, or different steps, performed in a similar or different order. For example, as described above, routing path recalculations may be performed whenever a change is detected at 148. Some operations shown in FIG. 6 may also be ongoing. Change detection at 148 might not preclude the receipt and processing of new path requests at 142, for instance.

There may also be various ways of performing the illustrated steps. Path computations performed at 144 might take specially configured paths such as shortcuts into account, for example.

Further variations of the method 140 may be or become apparent to those skilled in the art.

Aspects of the present invention may provide for calculation of routing paths across multiple routing areas regardless of the protocols used. In some embodiments, routing paths are calculated using a distributed algorithm, and are recalculated in the same manner when paths are affected by changes in a communication system. These functions may be supported, for instance, by routing path calculation devices in each routing area of a communication system, with each device calculating the shortest path for managed sub-routes or path segments in their respective areas, and a central controller that receives information on the sub-routes from the devices in order to correlate any sub-route changes to managed routes. Therefore, managed routes and their sub-routes can be dynamically updated and kept current with any system changes.

A mechanism for considering any specially configured paths along intermediate portions of a routing path during calculation of a routing path is also proposed.

These and other aspects of the invention solve problems for which there are currently no solutions in the field, and may have value in such applications as service management, service admission control, VoIP core network bandwidth reservation, etc. Furthermore, new routing paths can be calculated quickly and accurately for prospective sessions, to support determinations as to whether or not to allow such sessions, for example, as part of a Session Admission Control (SAC) function.

What has been described is merely illustrative of the application of principles of embodiments of the invention. Other arrangements and methods can be implemented by those skilled in the art without departing from the scope of the present invention.

For example, although OSPF is discussed in detail herein, embodiments of the invention may be applied to other protocols, such as other link-state protocols including IS-IS. Other illustrative examples should similarly be interpreted in a non-limiting manner.

The divisions of functions shown in the drawings and described above are also intended to be illustrative and non-limiting. Embodiments of the invention may be implemented using further, fewer, or different functional elements than considered above.

The specific forms and/or types of information used may similarly vary between embodiments of the invention. The table 80 of FIG. 4, for example, is intended solely for the purposes of illustration.

In addition, although described primarily in the context of methods and systems, other implementations of the invention are also contemplated, as instructions and/or data structures stored on one or more computer-readable media, for example.

We claim:

1. An apparatus comprising:
   an interface operable to enable communications with a plurality of routing path calculation devices, the routing path calculation devices being capable of calculating routing paths within respective routing areas of a communication system; and
   a routing path calculation control module operatively coupled to the interface and operable to identify routing areas of the respective routing areas that are involved in a routing path between routing path endpoints in different routing areas of the respective routing areas, to request, from multiple routing path calculation devices of the plurality of routing path calculation devices, respective routing path calculations for segments of the routing path in the identified routing areas, and to receive multiple routing path calculation responses from the multiple routing path calculation devices, the multiple routing path calculation responses comprising a respective response from each of the multiple routing path calculation devices, the respective response from each of the multiple routing path calculation devices comprising an indication of a result of the routing path calculation performed by the routing path calculation device for a respective segment of the routing path, the routing path calculation control module being operable to identify a first routing area in which one of the routing path endpoints is located, and to identify each other routing area involved in the routing path based on the indication of the result of the routing path calculation in each respective response.

2. The apparatus of claim 1, further comprising:
   a change detection module operatively coupled to the routing path calculation control module and operable to detect a topology change in one of the routing areas that affects a segment of the routing path.

3. The apparatus of claim 2, wherein the change detection module is further operatively coupled to the interface and is operable to detect a topology change in one of the routing areas by receiving through the interface an indication of the topology change from the routing path calculation device that is capable of calculating routing paths within the routing area.

4. The apparatus of claim 2, wherein the routing path calculation control module is further operable to request, from multiple routing path calculation devices of the plurality of routing path calculation devices, respective routing path recalculations for segments of a routing path between the routing path endpoints responsive to detection of a topology change that affects a segment of the routing path by the change detection module.

5. The apparatus of claim 4, further comprising:
   a memory operatively coupled to the routing path calculation control module,
   wherein the routing path calculation control module is further operable to store in the memory a mapping table that associates the routing path with the segments in the identified routing areas, and to determine whether a routing path between the path endpoints is to be recalculated by accessing the mapping table in the memory to determine whether the segment affected by the detected topology change is a segment of the routing path.

6. The apparatus of claim 1, wherein the plurality of routing areas comprises routing areas that use different routing protocols.

7. A system comprising:
   the apparatus of claim 1; and
   the plurality of routing path calculation devices.

8. The system of claim 7, wherein each routing path calculation device of the plurality of routing path calculation devices collects routing information associated with its routing area.

9. The system of claim 7, wherein the plurality of routing path calculation devices comprises a routing path calculation device that is operable to determine in its routing path calculations for a routing path segment originating at a source node and traversing intermediate nodes in the respective routing area of the routing path calculation device, whether a previously configured path that originates at an intermediate node of the routing path segment and terminates at another node of the routing path segment exists, and to take the previously configured path into account in calculating the routing path segment if it is determined that a previously configured path exists.

10. A method comprising:
    determining that a routing path between routing path endpoints in different routing areas of a communication system is to be calculated;

identifying routing areas of the communication system that are involved in the routing path;

requesting, from multiple routing path calculation devices of a plurality of routing path calculation devices that are capable of calculating routing paths within respective routing areas of the communication system, routing path calculations for respective segments of the routing path in the identified routing areas; and receiving multiple routing path calculation responses from the multiple routing path calculation devices, the multiple routing path calculation responses comprising a respective response from each of the multiple routing path calculation devices, the respective response from each of the multiple routing path calculation devices comprising an indication of a result of the routing path calculation performed by the routing path calculation device for a respective segment of the routing path, the identifying comprising identifying a first routing area in which one of the routing path endpoints is located, and identifying each other routing area involved in the routing path based on the indication of the result of the routing path calculation in each respective response.

11. The method of claim 10, further comprising:
detecting a topology change in one of the routing areas that affects a segment of the routing path.

12. The method of claim 11, wherein detecting comprises receiving an indication of the topology change from the routing path calculation device that is capable of calculating routing paths within the routing area.

13. The method of claim 11, further comprising:
requesting, from multiple routing path calculation devices of the plurality of routing path calculation devices, routing path recalculations for respective segments of a routing path between the routing path endpoints responsive to detection of a topology change that affects a segment of the routing path.

14. The method of claim 10, further comprising:
each routing path calculation device of the plurality of routing path calculation devices collecting routing information associated with its routing area.

15. The method of claim 10, further comprising:
a routing path calculation device of the multiple routing path calculation devices performing its routing path calculation for its respective routing path segment originating at a source node and traversing intermediate nodes in the respective routing area of the routing path calculation device, determining whether a previously configured path that originates at an intermediate node of the routing path segment and terminates at another node of the routing path segment exists, and taking the previously configured path into account in calculating the routing path segment if it is determined that a previously configured path exists.

16. A non-transitory computer-readable medium storing instructions which when executed perform the method of claim 10.

* * * * *